Jan. 31, 1961 J. H. GUYTON ET AL 2,970,212
TRANSISTORIZED LOW VOLTAGE RECEIVER
Filed Sept. 27, 1956
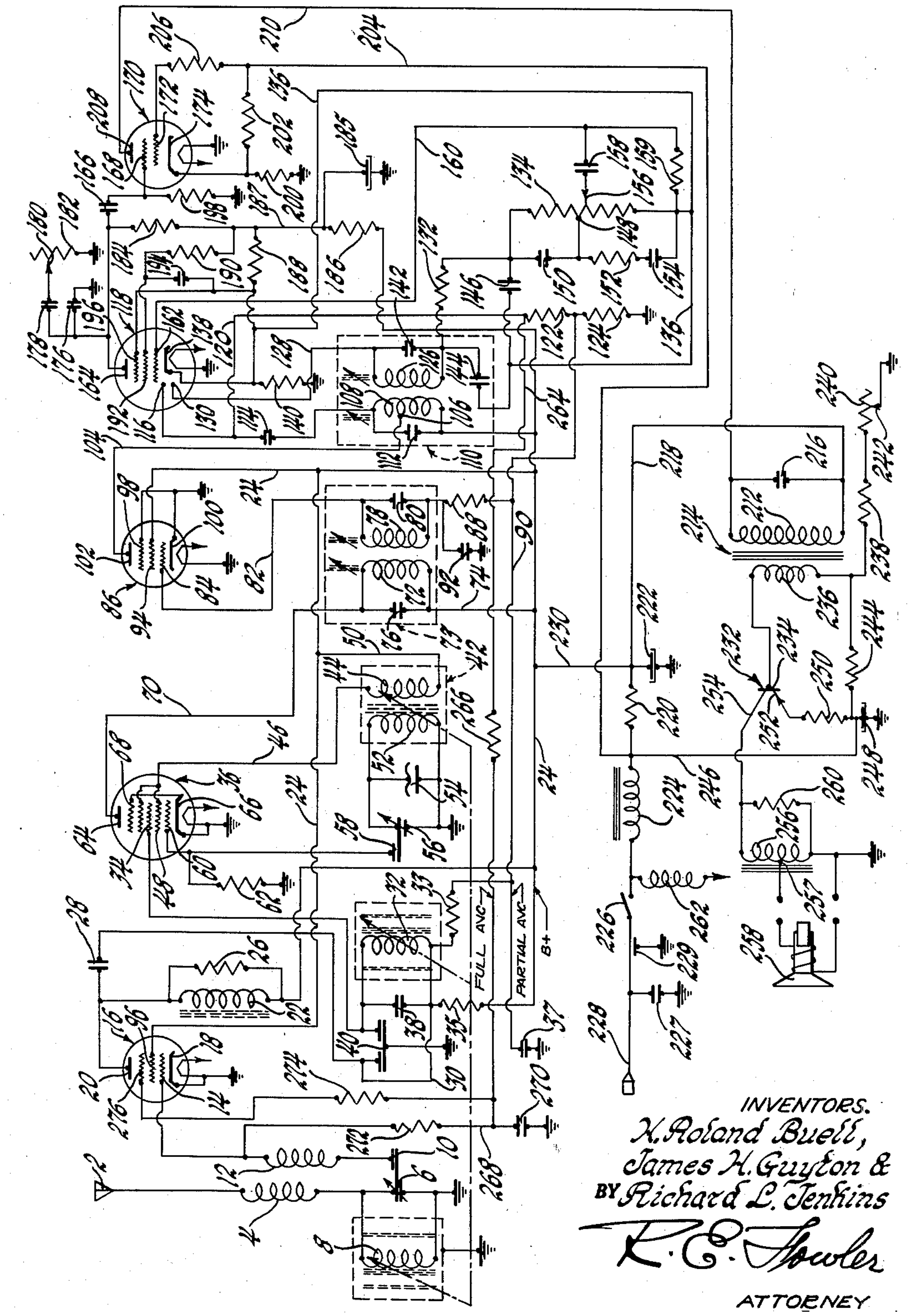
INVENTORS.
H. Roland Buell,
James H. Guyton &
BY Richard L. Jenkins
R. E. Fowler
ATTORNEY United States Patent Office 2,970,212
Patented Jan. 31, 1961

2,970,212

TRANSISTORIZED LOW VOLTAGE RECEIVER

James H. Guyton, Richard L. Jenkins, and Harry Rolland Buell, Kokomo, Ind., assignors to General Motors Corporation, Detroit, Mich., a corporation of Delaware Filed Sept. 27, 1956, Ser. No. 612,388

5 Claims. (Cl. 250—20)

This invention relates to radio receiving apparatus and more particularly to low voltage radio receiving means that operates entirely at the voltage of a low voltage power source.

While in the past, radio receiving apparatus has been utilized that was powered mainly by a low voltage source, means were incorporated therein to supply necessary higher voltages for tube electrodes and other higher voltage components. This last named means usually consisted of either an auxiliary higher voltage battery or a vibrator power pack. With the advent of transistors which are low voltage components, more interest has been created in complete low voltage systems.

It is therefore an object in making this invention to provide a radio receiver whose components are completely operable from low voltage such as that of a conventional storage battery.

It is a further object in making this invention to provide a radio receiver particularly adapted for use in automotive vehicles and operable from the vehicle's storage battery.

It is a still further object in making this invention to provide a radio receiver requiring only a moderate current consumption and utilizing transistor amplifying means.

With these and other objects in view which will be apparent as the specification proceeds, our invention will be best understood by reference to the following specification and claims and the illustration of the accompanying drawing, in which:

The figure is a circuit diagram of a radio receiver embodying our invention.

The present radio receiver utilizes low voltage tubes for the radio frequency amplifier, mixer, intermediate frequency amplifier, detector, first and second audio frequency amplifier stages and a transistor or semi-conductor for the final audio frequency amplifying stage. All of the tubes utilized operate from a conventional storage battery voltage, for example, 12 volts. The receiver shown incorporates permeability tuning though our invention is not restricted to such type and may be used with any conventional types of tuning.

In the figure, the antenna 2 is connected to one end of an air core induction coil 4, the opposite end of said winding being connected to ground through an adjustable condenser 6. Tuning coil 8 is connected across condenser 6 and its inductance is adapted to be varied by movement of an adjustable comminuted core which is movable into and out of the coil as indicated by dash lines and an arrow. This provides means for tuning the antenna circuit over the desired frequency band. A second condenser 10 formed of one of the plates of the first condenser 6 and an additional plate is connected through a further inductive winding 12 to the control grid 14 of the radio frequency amplifier tube 16. Coils 4 and 12 provide means for suppressing motor noise in the receiver. The cathode 18 of tube 16 is grounded.

The plate 20 of tube 16 is connected through a resistance 26 to the power supply line 24. A choke coil 22 is connected in shunt to the resistance 26. Resistance 26 is of the same order of magnitude as the input impedance of the RF tuned circuit near the lower end of the frequency band. Since the impedance of the RF tuned circuit is much less at the high frequency end of the band, the shunting effect of the resistance 26 is lessened and the stage gain is maintained more constant than would be the case if the RF tuned circuit impedance were allowed to determine the gain at various frequencies in the band. The choke 22 is self-resonant with distributed and circuit capacities at a frequency outside the band. This combination maintains DC plate voltage of tube 16 near the supply voltage potential for optimum tube operation substantially constant. Plate 20 is also connected through coupling condenser 28 and line 30 to one terminal of a resonant circuit including tuning coil 32. The remaining terminal of coil 32 is connected directly to control grid 34 of the tube 36 of the mixer stage. A condenser 38 is connected across tuning coil 32 to act as an image suppressor and a second comminuted iron core commonly mounted with the first to simultaneously move therewith is provided to tune the resonant circuit, formed of two condensers 40 in series and the condenser 38 and coil 32, as indicated by the dash lines and arrow in this section. Capacitance means 40 comprises a grounded plate and a pair of spaced plates forming two condensers connected to lines 30 and grid 34 respectively, to couple these parts.

The local oscillator for generating oscillations to be mixed in tube 36 with the incoming signal are provided from an oscillator section including a tunable transformer 42 having a primary 44, one terminal of which is connected through line 46 to the screen grid 48 of the tube 36 which screen grid acts as the oscillator plate. The other terminal of the primary 44 is connected through line 50 to the power supply line 24. The secondary winding 52 of the transformer 42 has a temperature compensating condenser 54 connected directly across its terminals in parallel with an adjustable condenser 56, these three elements forming a resonant circuit tunable to the frequencies of a band required by the converter to produce a proper intermediate frequency. Condenser 56 is also of the form having a common plate with a further condenser 58 coupling the same to the oscillator grid 60 of the tube 36. Grid 60 is likewise connected to ground through biasing resistor 62. Transformer 42 also has a comminuted iron core which may be inserted within the coils 52 and 44 to tune the resonant circuit over its band simultaneously with the first two. Again this is indicated by the dash and dot arrow and dash lines adjacent the transformer.

For tuning the receiver therefore, the operator moves the communited cores and tunes the resonant antenna, radio frequency stage and oscillator circuits. Thus the locally generated frequency is applied to the oscillator grid 60 while the amplified received frequency is applied to the control grid 34. These two signals are mixed in the electron stream of the tube 36 and the resultant difference frequency applied to the plate 64 of that tube. The cathode 66 of the tube 36 is grounded and is likewise connected to the suppressor grid 68 located adjacent the plate. The plate 64 is connected through line 70 to the primary 72 of the intermediate frequency transformer, the other terminal of which is connected through line 74 to the power supply line 24. A condenser 76 tunes the primary 72 of the intermediate frequency transformer 73 to the intermediate frequency and is connected thereacross.

The secondary 78 of the intermediate frequency transformer is tuned by a shunt condenser 80 and has one terminal connected through line 82 to the control grid 84 of the intermediate frequency amplifying tube 86. The remaining terminal of the secondary 78 is connected through resistance 88 to line 90 and also through a high frequency bypass condenser 92 to ground. The screen grid 94 of the tube 86 is connected directly to line 24 as is the screen grid 96 of the radio frequency amplifier tube 16. The suppressor grid 98 of the tube 86 is connected to cathode 100 and to ground. The plate 102 is connected through line 104 to a tap 106 on the primary 108 of the last intermediate frequency transformer 110. A condenser 112 is connected across the primary 108 to tune the same to the intermediate frequency. The lower terminal of the primary 108 is connected directly to the power supply line 24 and the upper terminal connected through a coupling condenser 114 to a diode anode 116 of the detector amplifier tube 118. This diode is used for developing an automatic volume control voltage and is likewise connected through line 120 to a potential divider including two resistances 122 and 124 connected in series between line 120 and ground. The secondary 126 of the last intermediate frequency transformer has one terminal connected through line 128 to a second diode anode 130 in the tube 118. This anode is used for detecting the audio signal.

The opposite terminal of the secondary 126 is connected to a resistor 132 and then in turn to a series connected resistor 134 which acts as a volume control for the receiver. The opposite terminal of the resistor 134 is connected to line 136 which extends to the cathode 138 of the tube 118. Biasing resistor 140 is connected between the cathode 138 and ground. A condenser 142 is connected across secondary 126 to tune the same to a resonant intermediate frequency. A filtering condenser 144 is connected between the lower terminal of the secondary 126 and the line 136. A second condenser 146 is connected between line 136 and the upper terminal of resistor 134. The detected signal is developed across resistance 134. Resistance 134 has a permanently affixed tap 148 and a condenser 150 is connected in shunt to the upper portion of the resistance 134. In like manner, a resistance 152 and condenser 154 in series are connected in shunt across the bottom half of the resistor 134. A variable tap 156 movable over the surface of the resistance 134 and providing the volume control is connected through coupling condenser 158 to line 160 extending to the control grid 162 of the amplifying section of the tube 118. A biasing resistor 159 is connected between line 136 and line 160. This provides a first audio frequency amplifying stage.

The plate 164 of tube 118 is directly coupled through coupling condenser 166 to the control grid 168 of the power amplifying tube 170 for the audio frequency. This tube 170 is provided to give a high current gain and is therefore provided with an accelerating grid 172 located nearer the cathode 174 than the control grid 168. A tone control is provided which includes a condenser 176 connected between plate 164 and ground, together with a second condenser 178 likewise connected to plate 164 and thence through a variable tap 180 and a portion of resistance 182 to ground depending upon the setting of the tap. Condenser 176 removes intermediate frequency components from the audio amplifier, primarily. The adjustment of tap 180 provides the desired tone control. Plate 164 is connected through plate load resistor 184 and line 187 to series resistor 186 which is connected to supply line 24. Condenser 185 is connected between line 187 and ground to provide, in conjunction with resistor 186, a supply line filter for tube 118 circuits. A biasing resistor 188 is connected from line 187 intermediate the two resistances 184 and 186 to line 136. A limiting resistor 190 is connected from the same intermediate point to the screen grid 192 of the tube 118. A condenser 194 is connected between the screen and suppressor grids 192 and 196 respectively. Suppressor grid 196 is further tied through line 136 to cathode 138. A biasing resistor 198 is connected between control grid 168 on tube 170 and ground.

The cathode 174 of tube 170 is biased through resistor 200 between cathode 174 and ground and through bias bleeder resistor 202 connected to the cathode and supply line 204. Accelerating grid 172 of tube 170 is likewise connected to power line 204 through resistor 206. The plate 208 of the power amplifier is connected through line 210 to primary 212 of an audio frequency coupling transformer 214 coupling this last stage of tube amplification to the final transistor output. A condenser 216 is connected in shunt to the primary 212 and the opposite terminal of the primary is connected through line 218 to a power supply filter circuit including a resistor 220 and a bypass condenser 222 to ground. The resistance 220 is further connected through filtering choke 224 to the main power switch 226 fed from the A power line 228. Filter condensers 227 and 229 are each tied from line 228 to ground. Line 218 is likewise connected through tie line 230 with previously described power supply line 24. Thus the relatively high current output of the tube 170 is applied through the coupling transformer 214 to the transistor amplifier stage.

The transistor 232 has its base electrode 234 connected to one terminal of the secondary winding 236. The opposite terminal of the secondary 236 is connected to ground through a potentiometer formed of a resistance 238 and a further series resistance 240 which is adjustably tapped at 242, the tap being grounded. The lower terminal of the secondary 236 is likewise connected through a resistance 244 to the power supply line 204 through tie line 246. A bypass condenser 248 is connected between this line and ground. A limiting resistor 250 is connected between line 246 and the emitter electrode 252 of the transistor 232 thus providing a biasing voltage on the emitter. The collector electrode 254 of the transistor 232 is connected directly to the output transformer coil 256 which supplies the loud speaker 258 between tap 257 and ground. The opposite end of the coil 256 is grounded and a resistor 260 is connected in shunt thereto. It is to be noted that all of the tube filaments are shown with one terminal indicated as an arrow and this is adapted to be connected to the A supply through filter choke 262 whose lower terminal is shown by a similar arrow indicating the connection.

The automatic volume control line for the receiver is as before mentioned, that connected to anode 116 of the tube 118 and the signal is developed across resistances 122 and 124 and this voltage is applied to line 264. Line 264 is connected through resistance 266 to line 268. Line 268 is connected to ground through a time constant condenser 270 providing the AVC time constant and also to one end of a limiting resistance 272. The opposite terminal of the resistance 272 is connected directly to control grid 14 of the tube 16. Line 268 is also connected through resistor 274 directly to the suppressor grid 276 of the tube 16. A further portion of the AVC control voltage circuit is provided from line 90 connected between resistor 122 and resistor 124. Line 90 is connected to ground through bypass condenser 37 providing an AVC time constant and also to one end of resistor 88. Line 90 is also connected to one end of resistor 33. The upper end of resistor 33 is connected through coil 32 to signal grid 34 of tube 36 and also to resistor 35. The lower end of resistor 35 is connected to supply line 24 and in conjunction with resistor 33 forms a voltage divider to improve the AVC operation.

As previously mentioned, all components of the current receiver are operative on battery voltage. The incoming signal is amplified, mixed, detected and further amplified through low voltage tubes which require only 12 volts on their plates. The last tube stage is a high current tube which provides a high current input to the transistor stage which directly drives the loud speaker. As before mentioned, the tube 170 is so constructed that the grid 172 is physically located nearer to the cathode 174 than the control grid 168. It therefore assists in attracting more electrons from the cathode to flow to the plate to increase current and this is a material advantage in low voltage sets. It supplies a more usable power level to the transistor. This is not to be construed in any limiting sense however, as other tubes of more conventional structure could be made and are available to perform usefully in this stage.

Again, since this is a low voltage receiver a problem of automatic volume control arose in the first stage. The AVC voltage is developed across resistors 122—124 and supplied conventionally to the control grid 14 of the tube 16. However, due to the low voltage operation, this provides a comparatively sharp cutoff characteristic with the type of tube used as tube 16 which in this instance is a 12AF6. Under strong signal conditions, therefore, RF voltages impressed on the control grid 14 were of approximately the same magnitude as the D.C. voltage applied back through line 268 to cut off the grid for automatic volume control purposes. Thus detection and rectification in this stage might then occur producing distortion and overload. In order to overcome this difficulty we have provided a connection between the AVC line 268 and the suppressor grid 276 through a resistance 274. This results in increasing the grid to plate capacity of tube 16 which provides for some feed through of energy even when the control grid 14 is cut off. This tends to widen out the cutoff characteristic and materially improves the AVC action of the set. While in some previous constructions such an increase in grid to plate capacity might cause regeneration, in the current set there is no such appreciable effect because of the Pi network in the coupling between tubes 16 and 36.

In order to obtain maximum gain in a receiver, it is customary to design the last IF transformer primary with as high impedance as practical. Thus the tube 86 looks into a high impedance. However, in a low voltage set it is also necessary to provide appreciable amounts of power for the AVC diode load and the detector diode load in order to provide sufficient AVC control voltage and sufficient drive for the audio. In order to increase this power requirement the impedance should be lessened. The present design incorporates a compromise in order to obtain as high gain as is possible with sufficient power output for the AVC and detector diode loads. It is to be noticed that the plate 102 of the tube 86 is not connected to the upper terminal of the primary 108 but instead is connected to a tap 106 a portion of the way down the winding. Thus the impedance looking into the tap 106 on coil 108 more nearly approaches the D.C. impedance of the tube 86 than it does the A.C. impedance of that tube. Maximum power is obtained by matching the D.C. impedance of the tube and transformer. Also the upper terminal of the primary winding is connected to the AVC diode 116. This provides a substantially high impedance and little gain is sacrificed. Thus a maximum power output with a maximum gain is accomplished by this construction.

In general, the receiver is of the superheterodyne type providing a satisfactory signal to the speaker 258 and powered by the vehicle storage battery connected to A lead 228. To tune the receiver the operator merely adjusts suitable tuning equipment simultaneously changing the inductances of tuning coils 8, 32 and 52. In order to adjust the volume output the operator moves tap 156 and in order to change tone he moves adjustable tap 180.

We claim:

1. In low voltage radio receiving apparatus all components of which are supplied with electrical power of approximately 12 volts having high frequency amplifying means and a detector, a high frequency transformer including a tapped primary and a secondary winding, conductive circuit means connecting the output of the high frequency amplifying means across the tapped portion of the primary and conductive circuit means connecting the full primary to said detector to produce a control voltage in said last named conductive circuit means so that the output of the high frequency amplifier provides a substantial gain for a usable control voltage and still retains high impedance.

2. In low voltage radio receiving apparatus all components of which are supplied with electrical power of approximately 12 volts, a high frequency amplifying means having an output circuit, a transformer having a tapped primary winding and a secondary winding, said output circuit being connected across the tapped portion of the primary, a first rectifier means and resistance means connected in series across the full primary to develop a control signal and second rectifier means connected across the secondary winding to produce a detected signal for audio amplification.

3. In low voltage radio receiving apparatus all components of which are supplied with electrical power of approximately 12 volts, a high frequency amplifying means having an output circuit, a transformer having a tapped primary winding and a secondary winding, said output circuit being connected across the tapped portion of the primary, a first rectifier means connected across the secondary winding to produce a detected signal for audio amplification and a second rectifier means connected across the full primary winding to develop a control voltage so that usable signals are derived from both rectifier means while retaining high impedance in the output circuit of the high frequency amplifier.

4. In a radio receiving system, a source of low voltage direct current power of approximately 12 volts, a radio frequency amplifying section, a detector section and an audio frequency amplifying section each including electron tubes connected to and operative upon the low voltage direct current power, coupling means between the radio frequency amplifying section and the detector section including a transformer having a tapped primary and a secondary winding the output of the radio frequency amplifying section being connected across the tapped portion of the primary and said detector section connected across the secondary winding to obtain relatively high gain and high power, electron accelerating means in the tube of the audio frequency amplifying section and a transistor amplifier stage connected to the last tube audio frequency amplifying section providing an audio frequency signal from a source of entirely low voltage direct current power.

5. In a radio receiving system, a source of low voltage direct current power of approximately 12 volts, a radio frequency amplifying section, a detector section and an audio frequency amplifying section each including electron tubes connected to and operative upon the low voltage direct current power, coupling means between the radio frequency amplifying section and the detector section including a transformer having a tapped primary and a secondary winding the output of the radio frequency amplifying section being connected across the tapped portion of the primary and said detector section connected across the secondary winding to obtain relatively high gain and high power, rectifier means connected across the full primary winding and means connected to said rectifier means and to the radio frequency amplifying section to feedback a control voltage thereto, electron accelerating means in the tube of the audio frequency amplifying section and a transistor amplifier stage connected to the last tube audio frequency amplifying section providing an audio frequency signal from a source of entirely low voltage direct current power.

References Cited in the file of this patent

UNITED STATES PATENTS 1,871,537 Lederer ---------------- Aug. 16, 1932

(Other references on following page)

UNITED STATES PATENTS

| | | |
|---|---|---|
| 1,876,841 | Black | Sept. 13, 1932 |
| 2,003,110 | Farnham | May 28, 1935 |
| 2,079,657 | Mountjoy | May 11, 1937 |
| 2,088,230 | Burnside | July 27, 1937 |
| 2,129,028 | Van Roberts | Sept. 6, 1938 |
| 2,171,639 | Armstrong | Sept. 5, 1939 |
| 2,209,394 | Farrington | July 30, 1940 |
| 2,303,357 | Hoover | Dec. 1, 1942 |
| 2,361,616 | Everett | Oct. 31, 1944 |
| 2,452,340 | Van der Heem | Oct. 26, 1948 |
| 2,606,290 | Van Wageningen | Aug. 5, 1952 |
| 2,810,071 | Race | Oct. 15, 1957 |

OTHER REFERENCES

"High-Gain Low-Drain Portable Radio," by Queen, Radio Electronics, March 1954, pages 84, 86, 87, 90.

"Tube-Transistor Radio" (an anonymous article), Electronic Design, July 1955, pages 48, 49.